(12) United States Patent
Lim

(10) Patent No.: US 8,111,950 B2
(45) Date of Patent: Feb. 7, 2012

(54) IMAGE PROCESSING APPARATUS AND METHOD TO GENERATE REDUCED IMAGE

(75) Inventor: Sung-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 11/582,489

(22) Filed: Oct. 18, 2006

(65) Prior Publication Data

US 2007/0086680 A1   Apr. 19, 2007

(30) Foreign Application Priority Data

Oct. 19, 2005   (KR) .................. 10-2005-0098670

(51) Int. Cl.
*G06K 9/32* (2006.01)
(52) U.S. Cl. ......... 382/299; 382/276; 382/277; 382/298
(58) Field of Classification Search .................. 382/298, 382/299, 276, 277
See application file for complete search history.

(56) References Cited

U.S. PATENT DOCUMENTS

| | | | | |
|---|---|---|---|---|
| 4,447,882 A * | 5/1984 | Walz | ........................... | 382/301 |
| 4,656,664 A * | 4/1987 | Anderson et al. | ............. | 382/298 |
| 5,020,115 A * | 5/1991 | Black | ........................... | 382/298 |
| 5,293,432 A * | 3/1994 | Gonser et al. | ................. | 382/299 |
| 5,838,838 A * | 11/1998 | Overton | ....................... | 382/298 |
| 6,252,989 B1 | 6/2001 | Geisler et al. | | |
| 6,775,418 B1 * | 8/2004 | Yamauchi et al. | ............ | 382/258 |
| 6,810,155 B1 * | 10/2004 | Ting et al. | ..................... | 382/300 |
| 7,257,274 B2 * | 8/2007 | Brothers et al. | .............. | 382/298 |
| 7,555,171 B2 * | 6/2009 | Owen | ............................ | 382/299 |

FOREIGN PATENT DOCUMENTS

| | | |
|---|---|---|
| CN | 1301453 A | 6/2001 |
| EP | 1 083 736 A1 | 3/2001 |
| JP | 04-278680 | 10/1992 |
| KR | 10-1997-68650 | 10/1997 |

* cited by examiner

*Primary Examiner* — Matthew Bella
*Assistant Examiner* — Eric Rush
(74) *Attorney, Agent, or Firm* — Roylance, Abrams, Berdo & Goodman, LLP

(57) ABSTRACT

An image processing apparatus and method are provided in which a reduced image is generated by removing some of a plurality of pixels of an original image. A pixel value of a pixel to be removed is reflected into a pixel value of an adjacent pixel and a reduced image is generated using the reflection result and the removal result.

15 Claims, 10 Drawing Sheets

IMAGE PROCESSING APPARATUS AND METHOD TO GENERATE REDUCED IMAGE

CROSS-REFERENCE TO RELATED PATENT APPLICATIONS

This application claims the benefit under 35 U.S.C. §119 (a) of Korean Patent Application No. 10-2005-0098670, filed Oct. 19, 2005, in the Korean Intellectual Property Office, the entire disclosure of which is hereby incorporated by reference.

BACKGROUND OF THE INVENTION

1. Field of the Invention

The present invention relates to image processing such as reduction of image data. More particularly, the present invention relates to an image processing apparatus and method in which a loss of image data of a pixel to be removed is minimized by reflecting a pixel value of the pixel to be removed into a pixel value of an adjacent pixel that is not to be removed, thereby minimizing distortion of a reduced image.

2. Description of the Related Art

FIGS. 1A and 1B are reference diagrams for explaining a conventional image processing method. More specifically, FIG. 1A illustrates an original image 110, and FIG. 1B illustrates a reduced image 130 created by reducing the original image 110 of FIG. 1A to 75%.

Image reduction is performed by removing some pixels of the original image 110, for example, pixels included in columns 120 and 122. If the original image 110 is to be reduced to 75%, 25% of the pixels of the original image 110 should be removed.

When pixels are removed, some pixels become adjacent to each other 140 due to removal of intermediate pixels, and such adjacent pixels may be visually highlighted in the reduced image 130. In other words, since a portion of image data of the original image 110 is removed by removal of some pixels, pixels adjacent to the removed pixels may inadvertently become adjacent to each other 140. Thus, when an image is reduced using the conventional image processing method, a visually unpleasant portion is generated in a reduced image due to pixels that inadvertently become adjacent to each other due to the removal of some pixels. This problem is exacerbated as pixel values of the newly adjacent pixels approach 0.

Moreover, image reduction according to conventional image processing methods may result in a distorted, reduced image due to image data loss caused by removal of some pixels. This problem becomes serious as the reduction percentage approaches 100%.

SUMMARY OF THE INVENTION

Exemplary embodiments of the present invention provide an image processing method by which a loss of image data of a pixel to be removed is minimized by reflecting a pixel value of the pixel to be removed into a pixel value of an adjacent pixel that is not to be removed, thereby minimizing distortion of a reduced image.

Exemplary embodiments of the present invention also provide an image processing apparatus that minimizes a loss of image data of a pixel to be removed by reflecting a pixel value of the pixel to be removed into a pixel value of an adjacent pixel that is not to be removed, thereby minimizing distortion of a reduced image.

Exemplary embodiments of the present invention also provide a computer-readable medium having recorded thereon a program for an image processing method by which a loss of image data of a pixel to be removed is minimized by reflecting a pixel value of the pixel to be removed into a pixel value of an adjacent pixel that is not to be removed, thereby minimizing distortion of a reduced image.

According to exemplary implementation of the present invention, an image processing method is provided in which a reduced image is generated by removing some of a plurality of pixels of an original image, the image processing method including reflecting a pixel value of a pixel to be removed into an adjacent pixel, removing a pixel value, and generating the reduced image using the reflection result and the removal result.

The reflection of the pixel value can include updating a pixel value of an update pixel with a value corresponding to the pixel value of the update pixel and the pixel value of the pixel to be removed, wherein the update pixel indicates a pixel that is adjacent to the pixel to be removed and is not to be removed.

The reflection of the pixel value can include determining whether a processing type set for an interested pixel (that is, a pixel to be processed) comprises pixel removal, determining whether a processing type set for a pixel adjacent to the interested pixel comprises pixel value update if the processing type for the interested pixel comprises pixel removal, and updating a pixel value of the adjacent pixel by reflecting a pixel value of the interested pixel into the pixel value of the adjacent pixel if the processing type set for the adjacent pixel comprises pixel value update.

The reflection of the pixel value can include outputting the adjacent pixel if the processing type set for the adjacent pixel is not pixel value update and proceeding to the generation of the reduced image. The reflection of a pixel value can generally include modifying a pixel value in some manner that depends on the value of another pixel.

The image processing method can further include setting a processing type for each pixel of the original image and proceeding to the reflection of the pixel value. The pixel value can be binary data.

According to another exemplary implementation of the present invention, an image processing apparatus is provided in which a reduced image is generated by removing some of a plurality of pixels of an original image, the image processing apparatus including a pixel value updating unit for reflecting a pixel value of a pixel to be removed into a pixel value of an adjacent pixel, a pixel removing unit for removing a pixel value, and a reduced image generating unit for generating the reduced image using the reflection result and the removal result.

According to still another exemplary implementation of the present invention, there is provided a computer-readable medium having recorded thereon a program for an image processing method in which a reduced image is generated by removing some of a plurality of pixels of an original image, the program including code for reflecting a pixel value of a pixel to be removed into a pixel value of an adjacent pixel, code for removing a pixel value, and code for generating the reduced image using the reflection result and the removal result.

BRIEF DESCRIPTION OF THE DRAWINGS

The above and other exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1A:
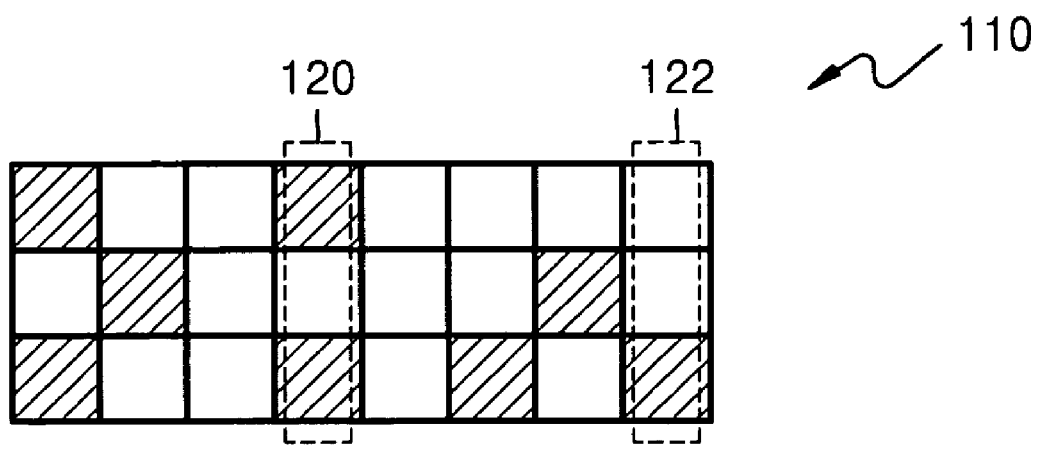
FIGS. 1A and 1B are reference diagrams for explaining a conventional image processing method.
Figure 1B:
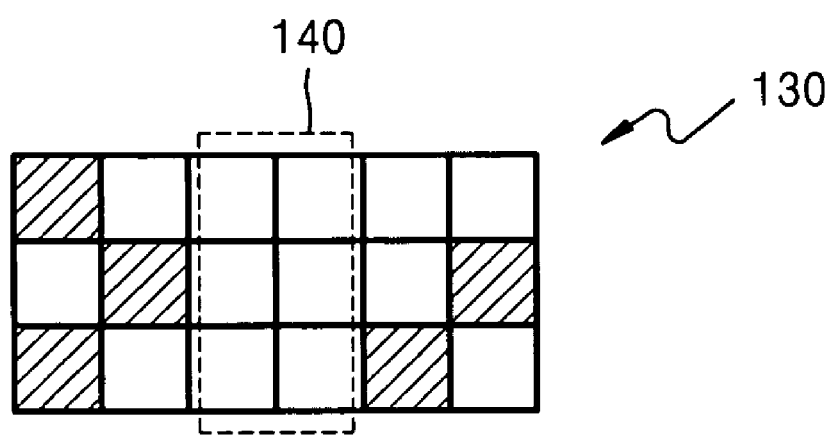
Figure 2:
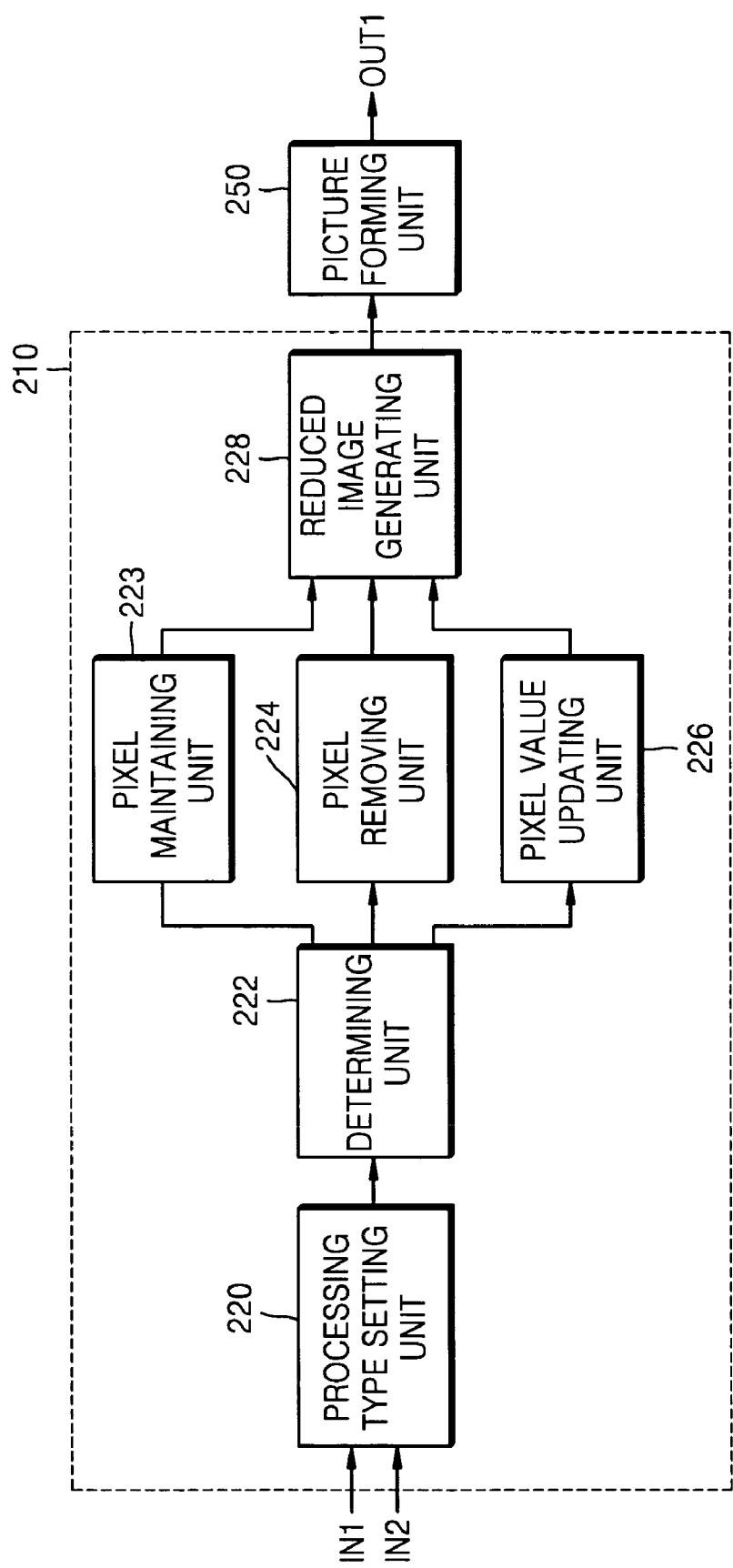
FIG. 2 is a block diagram of an image processor according to an exemplary embodiment of the present invention.

FIG. 2 is a block diagram of an image processor according to an exemplary embodiment of the present invention. The image processor includes an image processing unit 210 and a picture forming unit 250. The image processing unit 210 includes a processing type setting unit 220, a determining unit 222, a pixel maintaining unit 223, a pixel removing unit 224, a pixel value updating unit 226, and a reduced image generating unit 228.

IN1 indicates an original image and IN2 indicates an instruction for the original image IN1 to be reduced. In other words, IN1 indicates an original image expressed by data that can be binary data. In this case, for convenience of explanation, 0 indicates colorless data and 1 indicates colored data.

IN2 indicates an image processing instruction signal to generate a reduced image by reducing the original image IN1. IN2 includes information about a set reduction percentage that can be changed. Here, the reduction percentage can be set at around 100%. For example, the reduction percentage may be set to a value greater than or equal to 90% and less than 100%.

The image processing unit 210 reduces the original image IN1 at the set reduction percentage to generate a reduced image, and the picture forming unit 250 forms a picture of the reduced image.

The image processing unit 210 and the picture forming unit 250 can be provided in equipment such as a facsimile machine, a printer, and a multi-function peripheral (MFP), which are provided with an original image, reduce the original image to generate a reduced image, and form a picture of the reduced image.

The processing type setting unit 220 sets a processing type for each pixel of the original image IN1 according to the information about a set reduction percentage included in the image processing instruction signal IN2. Here, the processing type indicates a processing type of the image processor according to exemplary embodiments of the present invention.

For example, the processing type may be pixel value update, pixel removal, or pixel maintenance. Hereinafter, for convenience of explanation, it is assumed that the processing type set by the processing type setting unit 220 includes pixel value update, pixel removal, and pixel maintenance.

Hereinafter, a pixel whose pixel value is to be updated by image processing according to exemplary embodiments of the present invention will be referred to as an update pixel, a pixel to be removed will be referred to as a removal pixel, and a pixel to be maintained will be referred to as a maintenance pixel.

In other words, the processing type setting unit 220 sets a processing type for each pixel of the original image IN1 and designates each pixel as one of an update pixel, a removal pixel, and a maintenance pixel.

The determining unit 222 analyzes a processing type set in a pixel to be processed (hereinafter, referred to as an interested pixel). For example, the determining unit 222 determines whether the set processing type of the interested pixel is pixel value update, pixel removal, or pixel maintenance.

The pixel maintaining unit 223, the pixel removing unit 224, and the pixel value updating unit 226 each operate according to the determination result of the determining unit 222. In other words, the pixel maintaining unit 223 outputs the interested pixel according to the determination result of the determining unit 222, the pixel removing unit 224 removes the interested pixel according to the determination result of the determining unit 222, and the pixel value updating unit 226 updates a pixel value of the interested pixel according to the determination result of the determining unit 222.

For example, if the determining unit 222 determines that the interested pixel is a maintenance pixel, the pixel maintaining unit 223 outputs the interested pixel. If the determining unit 222 determines that the interested pixel is a removal pixel, the pixel removing unit 224 removes the interested pixel. If the determining unit 222 determines that the interested pixel is an update pixel, the pixel updating unit 226 updates a pixel value of the interested pixel.

The reduced image generating unit 228 is provided with processing results of the pixel maintaining unit 223, the pixel removing unit 224, and the pixel updating unit 226, buffers the processing results, and generates a reduced image by gathering the processing results.

The picture forming unit 250 forms a picture of the reduced image. For example, the picture forming unit 250 may print and output data of all pixels of the reduced image on a print medium. OUT1 indicates the output of a picture formed by the picture forming unit 250.

Figure 3A:
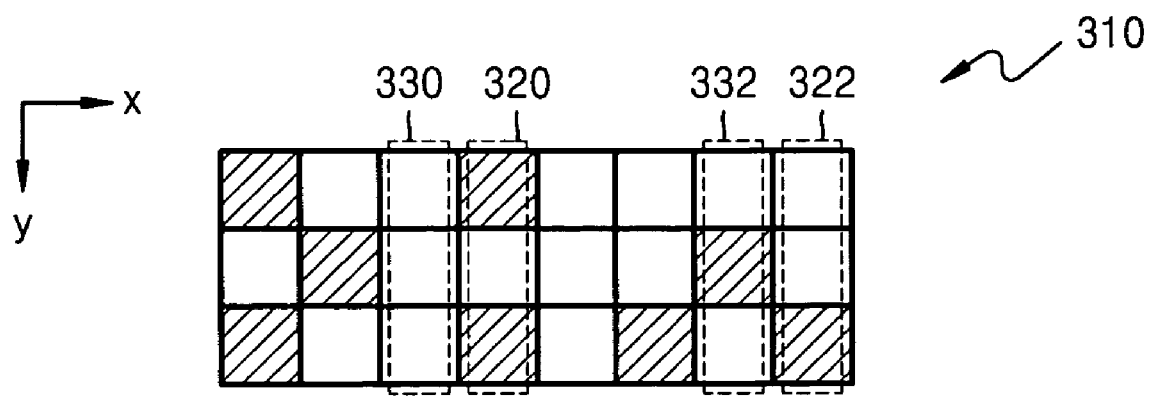
FIGS. 3A and 3B are reference diagrams for explaining image processing performed by an image processing unit of the exemplary embodiment of FIG. 2 according to a first exemplary implementation of the present invention.
Figure 3B:
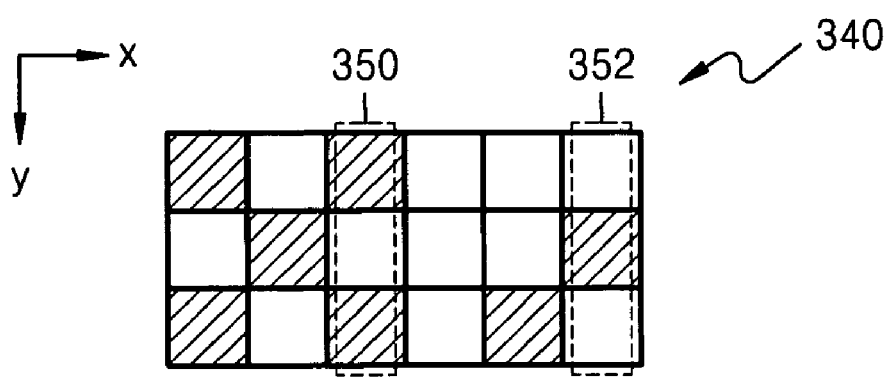

FIGS. 3A and 3B are reference diagrams for explaining image processing performed by the image processor 210 of the exemplary embodiment of FIG. 2 according to a first exemplary implementation of the present invention. FIG. 3A illustrates an original image 310, FIG. 3B illustrates a reduced image 340, and a reduction percentage according to the first exemplary implementation of the present invention of 75%.

According to the first exemplary implementation of the present invention, the original image 310 includes 3 rows and 8 columns of pixels, that is, a total of 24 pixels, and the reduced image 340 includes 3 rows and 6 columns of pixels, that is, a total of 18 pixels. In this example, 6 pixels (pixels included in columns 320 and 322) among the 24 pixels of the original image 310 are removed, thereby generating the reduced image 340.

For convenience of explanation, the position of the top left pixel is assumed to be (i, j)=(0, 0) in FIGS. 3A and 3B, and the position of the bottom right pixel is (i, j)=(2, 7) in FIG. 3A.

Image processing according to exemplary embodiments of the present invention can be performed on upper left pixels prior to lower right pixels in the original image 310. For example, image processing can be performed on pixels of the original image 310 in order of pixels at (0, 0), (1, 0), (2, 0), (0,1), (1,1), (2,1), (0,2), (1,2), (2,2), (0,3), . . . , (2,7).

x indicates the direction in which the original image 310 is reduced and y indicates the direction in which flag data is changed. The flag data will be described later.

The processing type setting unit 220 sets a processing type for each of the pixels of the original image 310. According to the first exemplary implementation of the present invention, the processing type setting unit 220 may set a processing type for each line. In other words, the processing type setting unit 220 can set a processing type for each line of the original image 310.

For example, the processing type setting unit 220 may designate each line of the original image 310 as one of a removal line, a maintenance line, and an update line. The removal line refers to a line to be removed by image processing according to exemplary embodiments of the present invention, the maintenance line refers to a line to be maintained even after image processing according to exemplary embodiments of the present invention, and the update line refers to a line in which pixel values are updated by image processing according to exemplary embodiments of the present invention.

Thus, the removal line includes at least one removal pixel, the maintenance line includes at least one maintenance pixel, and the update line includes at least one update pixel.

In this example, the reduction percentage is 75%, thus the processing type setting unit 220 can designate one of four lines as a removal line 320 or 322. The processing type setting unit 220 may also designate a line 330 or 332 adjacent to the removal line 320 or 322 as an update line. For convenience of explanation, a line on the left side of the removal line is designated as an update line in FIG. 3A. The processing type setting unit 220 can designate the remaining lines as maintenance lines.

As mentioned above, an interested pixel refers to a pixel to be processed, which is included in the original image 310. Thus, all pixels of the original image 310 may be interested pixels even if they are processed at different moments of time.

The pixel removing unit 224 removes an interested pixel according to the determination result of the determining unit 222.

If the determining unit 222 determines that the interested pixel is included in a maintenance line, the pixel maintaining unit 223 outputs the interested pixel. The output is provided to the reduced image generating unit 228.

Similarly, if the determining unit 222 determines that an interested pixel is included in the removal line 320 or 322, the pixel removing unit 224 removes the interested pixel. According to a conventional image processing method, image data of the removed interested pixel is not included in the reduced image 340. However, according to exemplary embodiments of the present invention, image data of the removed interested pixel is included in the reduced image 340. In other words, image data of a removal pixel is reflected into the reduced image 340 (pixels included in columns 350 or 352).

Reflection of image data of a removal pixel is performed by the pixel value updating unit 226. For example, if the determining unit 222 determines that an interested pixel is included in the update line 330 or 332, the pixel value updating unit 226 reflects a pixel value of the pixel that is adjacent to the interested pixel and is determined by the determining unit 222 to be included in the removal line 320 or 322 into a pixel value of the interested pixel and updates the pixel value of the interested pixel with the reflection result (a pixel included in a column 350 or 352).

For example, the pixel value updating unit 226 may update a pixel value of an update pixel with a value corresponding to the pixel value of the update pixel and a pixel value of a pixel to be removed by the pixel removing unit 225. The update pixel is adjacent to the pixel to be removed by the pixel removing unit 224 and is not to be removed.

For example, the pixel value updating unit 226 updates the pixel value of the update pixel according to Table 1.

TABLE 1

| A | B | F | OUT2 |
|---|---|---|------|
| 1 | 1 | X | 1 |
| 0 | 0 | X | 0 |
| 0 | 1 | 1 | 1 |
| 0 | 1 | 0 | 0 |
| 1 | 0 | 1 | 1 |
| 1 | 0 | 0 | 0 |

In Table 1, A indicates a possible pixel value of a pixel included in the update line 330 or 332 immediately before being updated, and B indicates a possible pixel value of a pixel included in the removal line 320 or 322 adjacent to the update line 330 or 332.

For example, A indicates a pixel value of an update pixel immediately before bring updated, B indicates a pixel value of a removal pixel adjacent to the update pixel, and OUT 2 indicates an updated pixel value of the update pixel.

In an exemplary implementation, A, B, and OUT2 each are expressed as binary data, where 0 indicates colorless data and 1 indicates colored data.

According to Table 1, when both A and B are 1, the pixel value updating unit 226 updates A with 1 (that is, OUT2=1). When both A and B are 0, the pixel value updating unit 226 updates A with 0 (that is, OUT2=0). However, if A and B are different from each other, the pixel value updating unit 226 determines OUT2 by referring to pixel value data F.

The pixel value data F comprises binary data used to determine OUT2 when A and B are different from each other. The pixel value data F has a specific value in an initialization state and is assumed to be initialized to 1 for convenience of explanation.

According to Table 1, when A and B are different from each other, the pixel value updating unit 226 updates A with 1 (that is, OUT2=1) if F is 1 and updates with A with 0 (that is, OUT2=0) if F is 0. In this way, F may be toggled whenever OUT2 is determined using F.

In FIG. 3A, a pixel value (0) of a pixel at (i, j)=(0, 2) is updated by reflecting a pixel value (1) of a pixel at (i, j)=(0, 3). At this time, if F is 1, a pixel value of a pixel at (i, j)=(0, 2) in FIG. 3B is updated with 1. And when an update is performed by referring to F, F is toggled. In this example, F is toggled to 0. That is, in FIG. 3A, F is 1 immediately before an update pixel at (i, j)=(0, 2) is processed, but F is 0 immediately before an update pixel at (i, j)=(1, 2) is processed.

In FIG. 3A, a pixel value (0) of a pixel at (i, j)=(2, 2) is updated by reflecting a pixel value (1) of a pixel at (i, j)=(2, 3). Since F is currently 0 due to toggling, a pixel value of a pixel at (i, j)=(2, 2) in FIG. 3B may be updated with 0. However, even when F is toggled to 0, if both A and B are 0 after the toggling, F may be re-initialized to 1. In this case, in FIG. 3A, F is 0 immediately before an update pixel at (i, j)=(1, 2) is processed, but F is 1 immediately before an update pixel at (i, j)=(2, 3) is processed. Thus, the pixel value of the pixel at (i, j)=(2, 2) in FIG. 3B is updated with 1.

When a line including a pixel to be processed is changed, F may be re-initialized. For example, even if F is 0 immediately before a pixel at (i, j)=(2, 4) is processed, it is preferable that F be updated with 1 immediately before a pixel at (i, j)=(0, 5) is processed.

Since the pixel value data F is useful when A and B are different from each other, it is not an issue in a case where A and B are the same as each other. In Table 1, such a case is expressed with X.

Figure 4A:
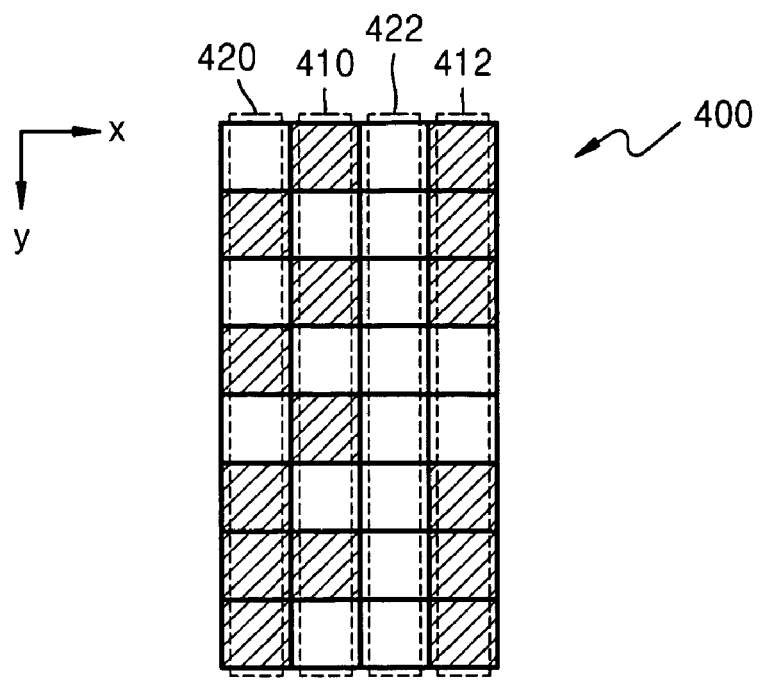
FIGS. 4A and 4B are reference diagrams for explaining image processing performed by the image processing unit of the exemplary embodiment of FIG. 2 according to a second exemplary implementation of the present invention.
Figure 4B:
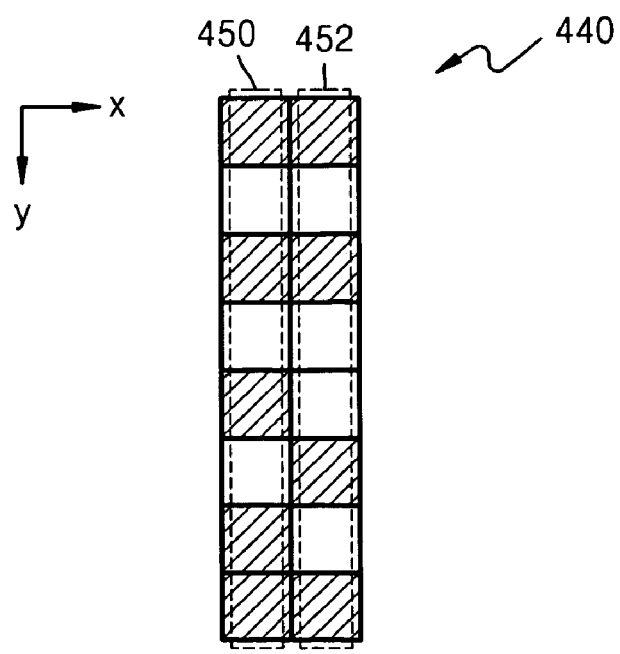

FIGS. 4A and 4B are reference diagrams for explaining image processing performed by the image processing unit 210 of the exemplary embodiment of FIG. 2 according to a second exemplary implementation of the present invention. FIG. 4A illustrates an original image 400, and FIG. 4B illustrates a reduced image 440. A reduction percentage according to the second exemplary implementation of the present invention is 50%. As will be described below, the above description of the first exemplary implementation of the present invention is applicable to the second exemplary implementation.

According to the second exemplary implementation of the present invention, the original image 400 includes 8 rows and 4 columns of pixels, that is, a total of 32 pixels, and the reduced image 440 includes 8 rows and 2 columns of pixels, that is, a total of 16 pixels. In this example, 16 pixels (pixels included in columns 410 and 412) among the 32 pixels of the original image 400 are removed, thereby generating the reduced image 440.

For convenience of explanation, the position of the top left pixel is assumed to be (i, j)=(0, 0) in FIGS. 4A and 4B, and the position of the bottom right pixel is (i, j)=(7, 3) in FIG. 4A.

Image processing according to exemplary embodiments of the present invention can be performed on upper left pixels prior to lower right pixels in the original-image 400. For example, image processing can be performed on pixels of the original image 400 in order of pixels at (0, 0), (0, 1), (0, 2), (0, 3), (1, 0), (1, 1), (1, 2), (1, 3), (2, 0), . . . , (7, 0), (7, 1), (7, 2), (7, 3).

x indicates the direction in which the original image 400 is reduced and y indicates the direction in which flag data is changed. The processing type setting unit 220 sets a processing type for each of pixels of the original image 400. According to the second exemplary implementation of the present invention, the processing type setting unit 220 may set a processing type for each line. In other words, the processing type setting unit 220 may set a processing type for each line of the original image 400. For example, the processing type setting unit 220 may designate each line of the original image 400 as one of a removal line, a maintenance line, and an update line.

In this example, the reduction percentage is 50%, thus the processing type setting unit 220 can designate one of two lines as a removal line 410 or 412. The processing type setting unit 220 may also designate a line 420 or 422 adjacent to the removal line 410 or 412 as an update line. For convenience of explanation, a line on the left side of the removal line is designated as an update line as in FIG. 4A. The processing type setting unit 220 can designate the remaining lines maintenance lines.

The determining unit 222 determines a processing type set for each pixel of the original image 400. If the determining unit 222 determines that an interested pixel is included in a maintenance line, the pixel maintaining unit 223 outputs the interested pixel. The output is provided to the reduced image generating unit 228.

Similarly, if the determining unit 222 determines that an interested pixel is included in the removal line 410 or 412, the pixel removing unit 224 removes the interested pixel. According to a conventional image processing method, image data of the removed interested pixel is not included in the reduced image 440. However, according to exemplary embodiments of the present invention, image data of the removed interested pixel is included in the reduced image 440. In other words, image data of a removal pixel is reflected into the reduced image 440.

Reflection of image data of a removal pixel is performed by the pixel value updating unit 226. For example, if the determining unit 222 determines that an interested pixel is included in the update line 420 or 422, the pixel value updating unit 226 reflects a pixel value of the pixel that is adjacent to the interested pixel and is determined by the determining unit 222 to be included in the removal line 410 or 412 into a pixel value of the interested pixel and updates the pixel value of the interested pixel with the reflection result.

For example, the pixel value updating unit 226 may update a pixel value of an update pixel with a value corresponding to the pixel value of the update pixel and a pixel value of a pixel to be removed by the pixel removing unit 225. The update pixel is adjacent to the pixel to be removed by the pixel removing unit 224 and is not to be removed.

For example, the pixel value updating unit 226 can update a pixel value of an update pixel according to Table 1, thereby obtaining an update pixel (a pixel included in a column 450 or 452) whose pixel value is updated.

Figure 5A:
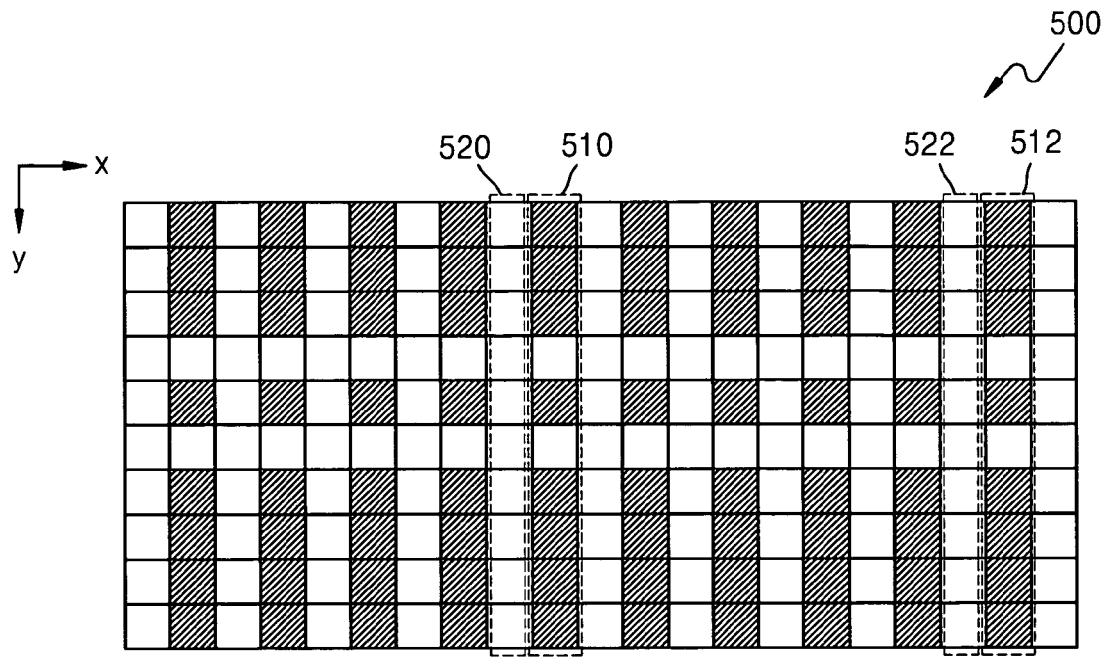
FIGS. 5A through 5C are reference diagrams for explaining image processing performed by the image processing unit of the exemplary embodiment of FIG. 2 according to a third exemplary implementation of the present invention.
Figure 5B:
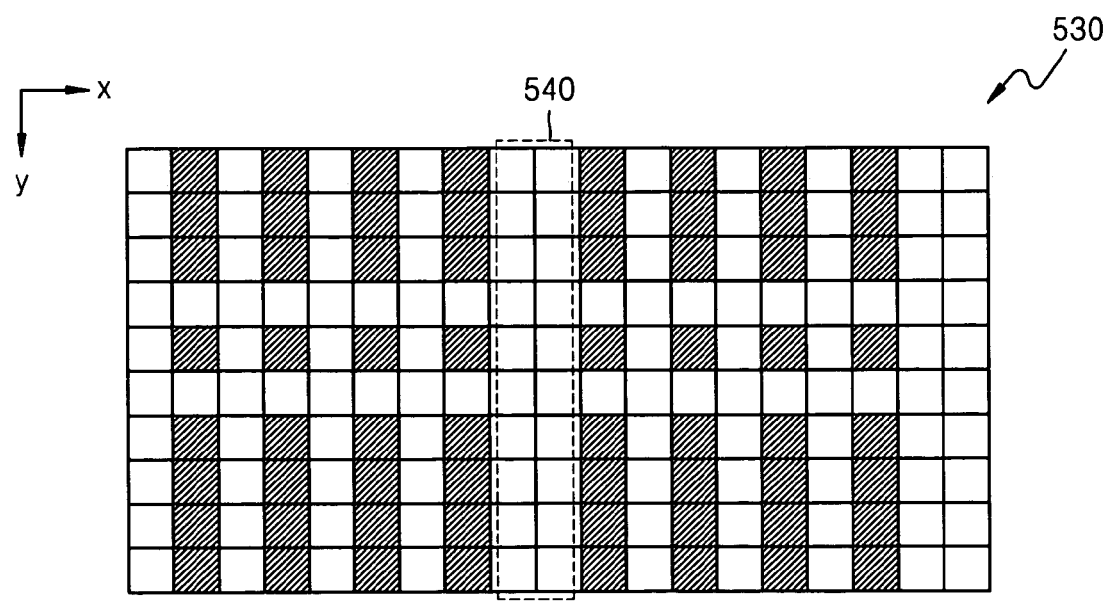
Figure 5C:
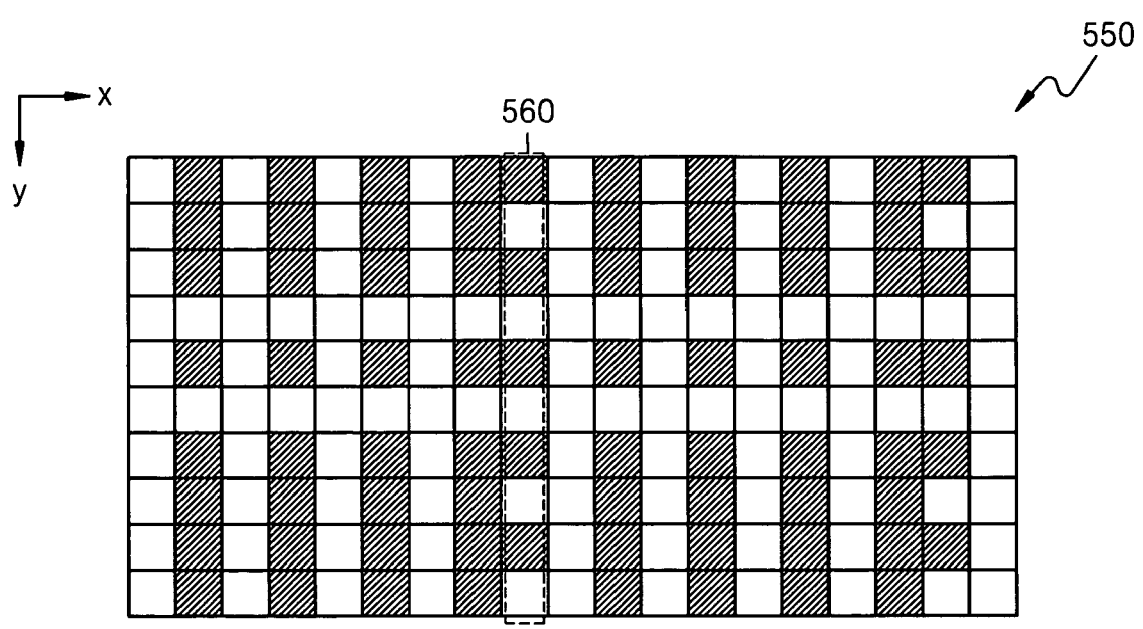

FIGS. 5A through 5C are reference diagrams for explaining image processing performed by the image processing unit 210 of the exemplary embodiment of FIG. 2 according to a third exemplary implementation of the present invention. FIG. 5A illustrates an original image 500, FIG. 5B illustrates a reduced image 530 according to a conventional image processing method, and FIG. 5C illustrates a reduced image 550 according to exemplary embodiments of the present invention. A reduction percentage according to the third exemplary implementation of the present invention is 90%. As will be described below, the above description of the first exemplary implementation of the present invention is applicable to the third exemplary implementation.

According to the third exemplary implementation of the present invention, the original image 500 includes 10 rows and 21 columns of pixels, that is, a total of 210 pixels, and reduced images 530 and 550 include 10 rows and 19 columns of pixels, that is, a total of 190 pixels. In this example, 20 pixels (pixels included in columns 510 and 512) among the 210 pixels of the original image 500 are removed, thereby generating the reduced image 530 or 550.

For convenience of explanation, the position of the top left pixel is assumed to be (i, j)=(0, 0) in FIGS. 5A and 5C, and the position of the bottom right pixel is (i, j)=(9, 20) in FIG. 5A.

Image processing according to exemplary embodiments of the present invention may be performed on upper left pixels prior to lower right pixels in the original image 500. For example, image processing can be performed on pixels of the original image 500 in order of pixels at (0, 0), (1, 0), (2, 0), (3, 0), (4, 0), (5, 0), (6, 0), (7, 0), (8, 0), (9, 0), (0, 1), (1, 1), (2, 1), (3, 1), (4, 1), (5, 1), . . . , (8, 20), (9, 20).

x indicates the direction in which the original image 500 is reduced and y indicates the direction in which flag data is changed. The processing type setting unit 220 sets a processing type for each of pixels of the original image 500. According to the third exemplary implementation of the present invention, the processing type setting unit 220 can set a processing type for each line. In other words, the processing type setting unit 220 can set a processing type for each line of the original image 500. For example, the processing type setting unit 220 can designate each line of the original image 500 as one of a removal line, a maintenance line, and an update line.

In this example, the reduction percentage is 90%, thus the processing type setting unit 220 may designate one of 10 lines as a removal line 510 or 512. The processing type setting unit 220 may also designate a line 520 or 522 adjacent to the removal line 510 or 512 as an update line. For convenience of explanation, a line on the left side of the removal line is designated as an update line in FIG. 4A. The processing type setting unit 220 can designate the remaining lines as maintenance lines.

The determining unit 222 determines a processing type set for each pixel of the original image 500. If the determining unit 222 determines that an interested pixel is included in a maintenance line, the pixel maintaining unit 223 outputs the interested pixel. The output is provided to the reduced image generating unit 228.

Similarly, if the determining unit 222 determines that an interested pixel is included in the removal line 510 or 512, the pixel removing unit 224 removes the interested pixel. According to a conventional image processing method, image data of the removed interested pixel is not included in the reduced image 530 (pixels included in columns 540). However, according to exemplary embodiments of the present invention, image data of the removed interested pixel is included in the reduced image 550 (pixels included in column 560). In other words, image data of a removal pixel is reflected into the reduced image 550.

Reflection of image data of a removal pixel is performed by the pixel value updating unit 226. For example, if the determining unit 222 determines that an interested pixel is included in the update line 520 or 522, the pixel value updating unit 226 reflects a pixel value of the pixel that is adjacent to the interested pixel and is determined by the determining unit 222 to be included in the removal line 510 or 512 into a pixel value of the interested pixel and updates the pixel value of the interested pixel with the reflection result.

For example, the pixel value updating unit 226 may update a pixel value of an update pixel with a value corresponding to the pixel value of the update pixel and a pixel value of a pixel to be removed by the pixel removing unit 225. The update pixel is adjacent to the pixel to be removed by the pixel removing unit 224 and is not to be removed.

For example, the pixel value updating unit 226 can update a pixel value of an update pixel according to Table 1, thereby obtaining an update pixel (a pixel included in a column 560) whose pixel value is updated.

As illustrated in FIG. 5B, a visually unpleasant portion 540 generated in the reduced image 530 according to the conventional image processing method is significantly minimized in the reduced image 550 according to exemplary embodiments of the present invention.

Figure 6A:
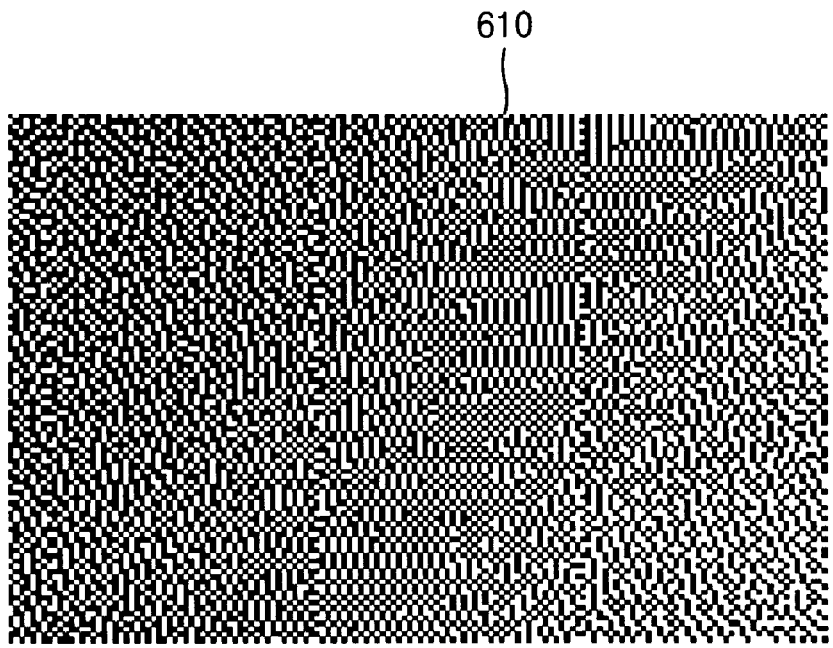
FIGS. 6A through 6C are reference diagrams for explaining image processing performed by the image processing unit of the exemplary embodiment of FIG. 2 according to a fourth exemplary implementation of the present invention.
Figure 6B:
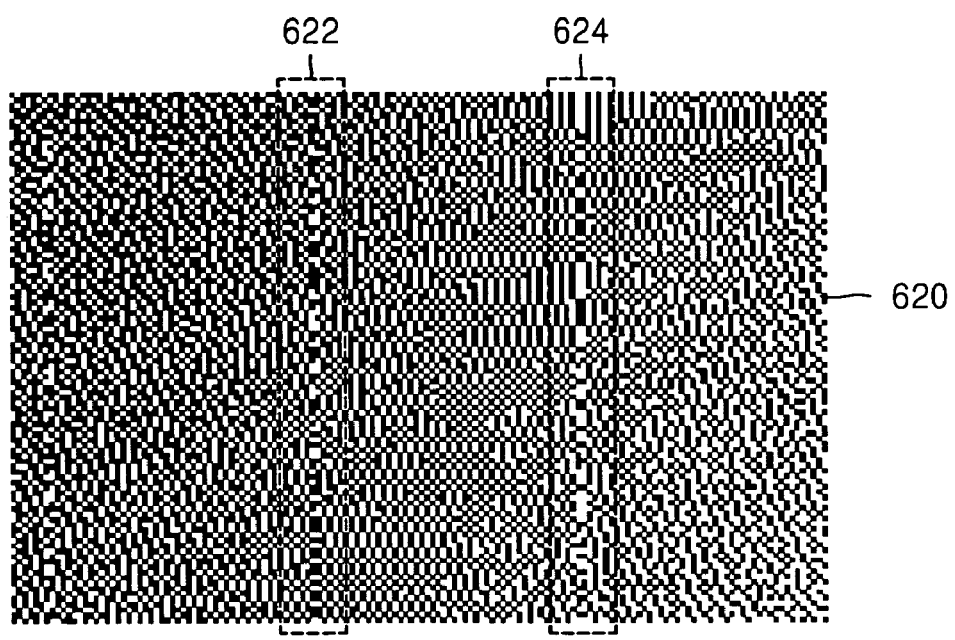
Figure 6C:
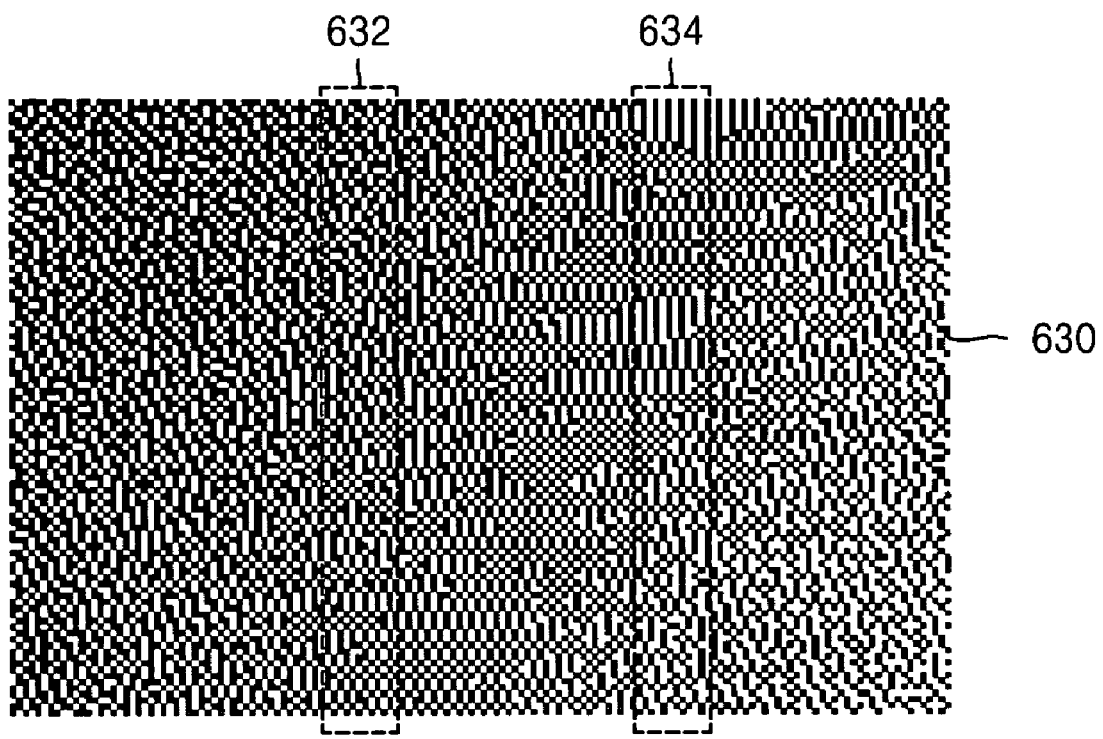

FIGS. 6A through 6C are reference diagrams for explaining image processing performed by the image processing unit 210 of the exemplary embodiment of FIG. 2 according to a fourth exemplary implementation of the present invention. FIG. 6A illustrates an original image 610, FIG. 6B illustrates a reduced image 620 according to a conventional image processing method, and FIG. 6C illustrates a reduced image 630 according to exemplary embodiments of the present invention. A reduction percentage according to the fourth exemplary implementation of the present invention is 98%. As will be described below, the above description of the first exemplary implementation of the present invention is applicable to the fourth exemplary implementation.

A reference numeral 622 or 624 indicates a visually unpleasant portion generated in the reduced image 620 according to the conventional image processing method. The visually unpleasant portion is generated because image data of removal pixels are entirely removed and image data cannot be naturally connected between newly adjacent pixels due to the removal.

On the other hand, when the original image 610 is reduced according to exemplary embodiments of the present invention, image data of a removal pixel is reflected into pixels adjacent to the removal pixel. Thus, as indicated by 632 or 634 in FIG. 6C, image data can be naturally connected between newly adjacent pixels due to the removal.

Figure 7:
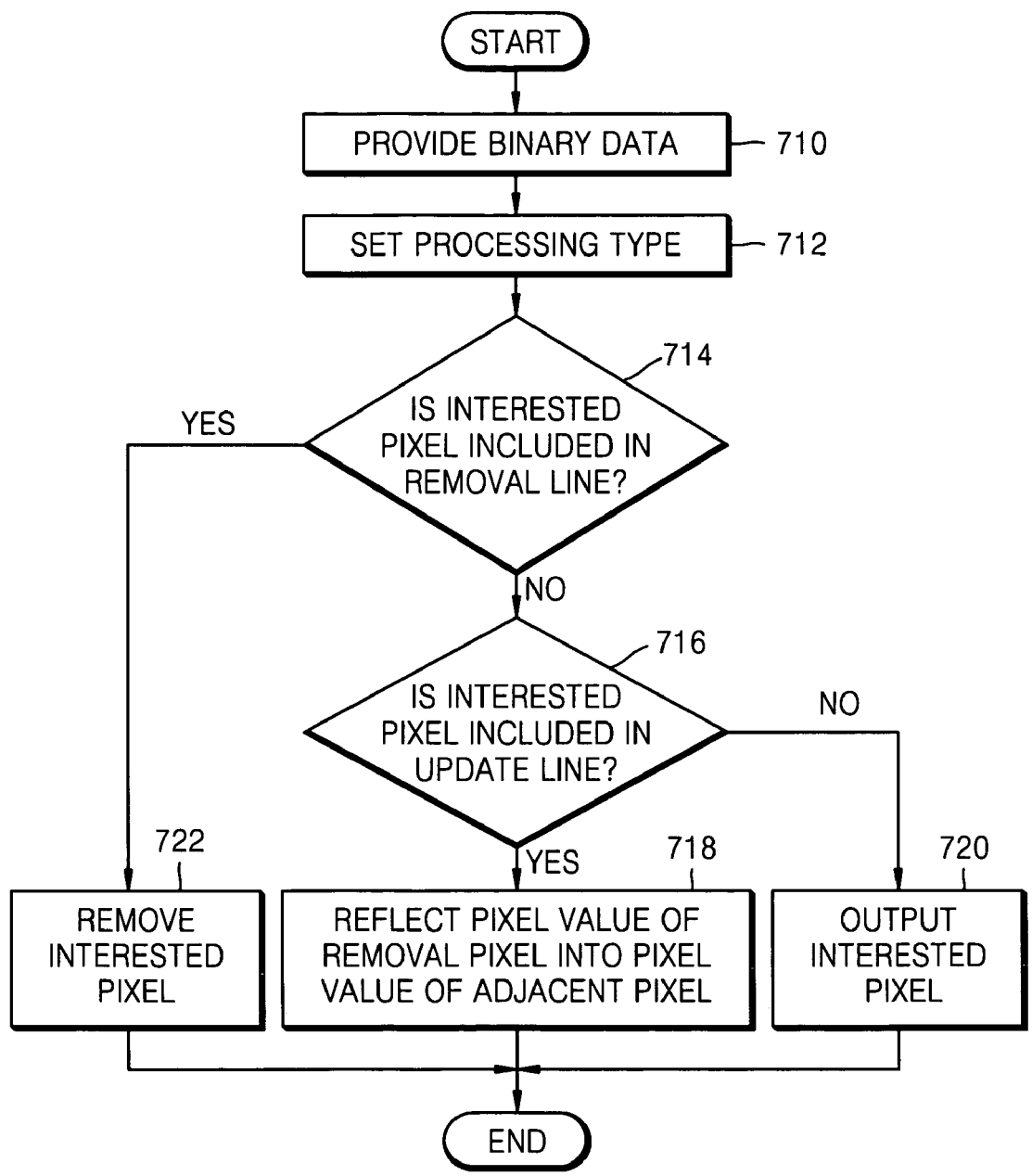
FIG. 7 is a flowchart illustrating an image processing method according to an exemplary embodiment of the present invention.

FIG. 7 is a flowchart illustrating an image processing method according to an exemplary embodiment of the present invention. Referring to FIG. 7, by reflecting a pixel value of a removal pixel into a pixel value of an adjacent pixel that is not to be removed, distortion of the reduced image is minimized in operations 710 through 722.

An original image is provided as binary data to the processing type setting unit 220, step 710. The processing type setting unit 220 sets a processing type for each pixel of the original image provided, step 712. The processing type setting unit 220 may set a processing type for each line.

The determining unit 222 determines whether an interested pixel is included in a removal line, step 714. In other words, the determining unit 222 determines whether the interested pixel is a removal pixel. If the determining unit 222 determines that the interested pixel is not a removal pixel in step 714, the determining unit 222 then determines whether the interested pixel is an update pixel, step 716. If the determining unit 222 determines that the interested pixel is an update pixel, the pixel value updating unit 226 updates a pixel value of the interested pixel by reflecting a pixel value of an adjacent removal pixel, step 718.

On the other hand, if the determining unit 222 determines that the interested pixel is not an update pixel in step 716, the pixel maintaining unit 223 outputs the interested pixel as a pixel processed according to exemplary embodiments of the present invention, step 720.

If the determining unit 222 determines that the interested pixel is a removal pixel in step 714, the pixel removing unit 224 removes the interested pixel, step 722.

Figure 8:
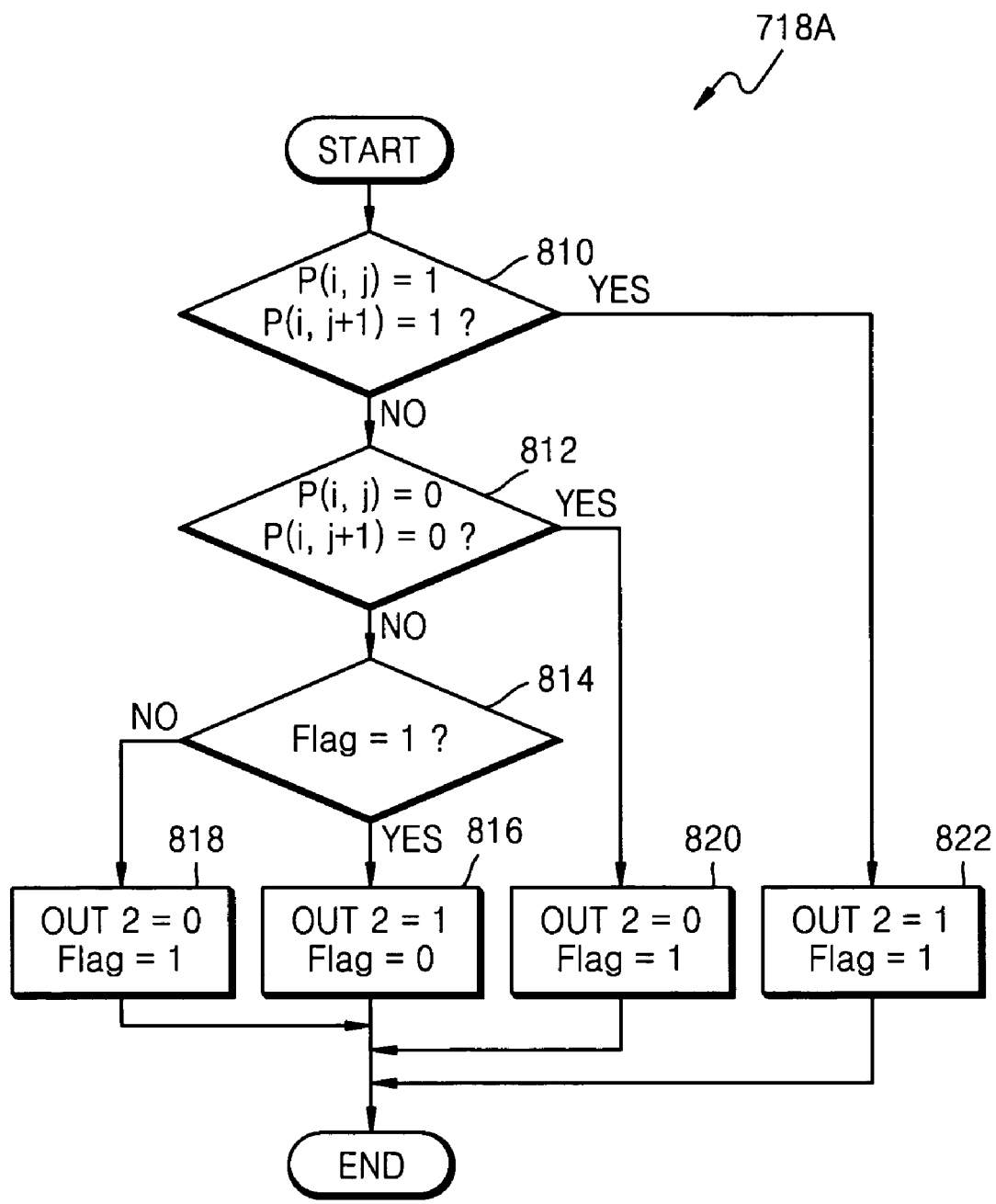
FIG. 8 is a flowchart illustrating an exemplary embodiment (718A) of step 718 of the exemplary embodiment of FIG. 7.

FIG. 8 is a flowchart illustrating an exemplary embodiment (718A) of step 718 of the exemplary embodiment of FIG. 7.

Referring to FIG. 8, a pixel value of a removal pixel is reflected into a pixel value of an adjacent pixel in steps 810 through 822.

Here, i, j, and OUT2 are the same as i, j, and OUT2 described with reference to FIGS. 3A through 5C. In particular, P(i, j) and P(i, j+1) indicate A and B described with reference to FIGS. 3A through 5C. Flag indicates the flag data described above.

The pixel value updating unit 226 determines whether both A and B are 1 (HIGH), step 810. If the pixel value updating unit 226 determines that one of A and B is 0 (LOW) in step 810, the pixel value updating unit 226 then determines whether both A and B are 0, step 812.

If the pixel value updating unit 226 determines that one of A and B is 1 in step 812, the pixel value updating unit 226 then determines whether Flag is 1, step 814.

If the pixel value updating unit 226 determines that Flag is 1 in step 814, the pixel value updating unit 226 outputs 1 as an updated pixel value OUT2 of an update pixel and toggles Flag (1) to 0, step 816.

On the other hand, if the pixel value updating unit 226 determines that Flag is 0 in operation 814, the pixel value updating unit 226 outputs 0 as an updated pixel value OUT2 of an update pixel and toggles Flag (0) to 1, step 818.

If the pixel value updating unit 226 determines that both A and B are 0 in step 812, the pixel value updating unit 226 outputs 0 as an updated pixel value OUT2 of an update pixel and initializes Flag (0 or 1) to 1, step 818.

If the pixel value updating unit 226 determines that both A and B are 1 in step 810, the pixel value updating unit 226 outputs 1 as an updated pixel value OUT2 of an update pixel and initializes Flag (0 or 1) to 1, step 822.

As described above, according to exemplary embodiments of the present invention, by reflecting a pixel value of a pixel to be removed into a pixel value of an adjacent pixel that is not to be removed, image data of the pixel to be removed is provided to image data of the pixel that is not to be removed, thereby minimizing a loss of the image data of the pixel to be removed. Thus, pixels that become newly adjacent due to the removal of a pixel are not visually highlighted over other pixels in a reduced image, thereby contributing to minimization of distortion of the reduced image.

Exemplary embodiments of the present invention can also be embodied as a computer-readable code on a computer-readable medium. The computer-readable medium can be any data storage device that can store data that can be thereafter read by a computer system. Examples of a computer-readable medium include read-only memory (ROM), random-access memory (RAM), CD-ROMs, magnetic tapes, floppy disks, optical data storage devices, and carrier waves. The computer-readable medium can also be distributed over network coupled computer systems so that the computer-readable code is stored and executed in a distributed fashion. Functional programs, code and code segments can be easily construed by programmers of ordinary skill in the art.

While the present invention has been particularly shown and described with reference to certain exemplary embodiments thereof, it will be understood by those of ordinary skill in the art that various changes in form and detail may be made therein without departing from the spirit and scope of the present invention as defined by the following claims and equivalents thereof.

What is claimed is:

1. An image processing method in which a reduced image is generated by removing some of a plurality of pixels of an original image, the image processing method comprising:

reflecting a pixel value of a pixel to be removed into a pixel value of a pixel adjacent to the pixel to be removed, resulting in an update pixel value;

removing the pixel to be removed; and generating the reduced image using the reflection result and the removal result;

wherein the reflecting of the pixel value comprises updating the update pixel value to 1 when the value of the pixel to be removed and the value of the update pixel are different from each other and pixel value data is 1, and updating the update pixel value to 0 when the value of the pixel to be removed and the value of the update pixel are different from each other and the pixel value data is 0; and wherein the update pixel indicates a pixel that is adjacent to the pixel to be removed and is not to be removed, the pixel value data is a predetermined value used to update the update pixel, and the pixel value data may be toggled when the updating is performed by referring to the pixel value data and a direction in which the pixel value data is toggled is perpendicular to a direction in which the original image is reduced.

2. The image processing method of claim 1, wherein the reflecting a pixel value comprises:

updating the pixel value of the update pixel with a pixel value corresponding to the pixel value of the update pixel and the pixel value of the pixel to be removed.

3. The image processing method of claim 1, wherein the reflecting a pixel value comprises:

determining whether a processing type set for an interested pixel that is to be processed comprises pixel removal;

determining whether a processing type set for a pixel adjacent to the interested pixel comprises pixel value update if the processing type for the interested pixel comprises pixel removal; and updating a pixel value of the adjacent pixel by reflecting a pixel value of the interested pixel into the pixel value of the adjacent pixel if the processing type set for the adjacent pixel comprises pixel value update.

4. The image processing method of claim 3, wherein the reflecting of the pixel value comprises outputting the adjacent pixel if the processing type set for the adjacent pixel is not pixel value update and proceeding to the generation of the reduced image.

5. The image processing method of claim 3, further comprising setting a processing type for each pixel of the original image and proceeding to the reflection of the pixel value.

6. The image processing method of claim 3, wherein the updating the pixel value comprises updating the pixel value of the adjacent pixel by referring to the pixel value data if the interested pixel value and the adjacent pixel value are different from each other, wherein the pixel value data is used to update the pixel value of the adjacent pixel.

7. The image processing method of claim 1, wherein the pixel value comprises binary data.

8. The image processing method of claim 1, further comprising printing the generated reduced image.

9. An image processing apparatus in which a reduced image is generated by removing some of a plurality of pixels of an original image, the image processing apparatus comprising:

a pixel value updating unit for reflecting a pixel value of a pixel to be removed into a pixel value of a pixel adjacent to the pixel to be removed, resulting in an update pixel value;

a pixel removing unit for removing the pixel to be removed;

a reduced image generating unit for generating the reduced image using the reflection result and the removal result; and a picture forming unit for printing the generated reduced image;

wherein the pixel value updating unit updates the update pixel value to 1 when the pixel value of the pixel to be removed and the pixel value of the update pixel are different from each other and pixel value data is 1, and the update pixel value to 0 when the value of the pixel to be removed and the value of the update pixel are different from each other and the pixel value data is 0; and wherein the update pixel indicates a pixel that is adjacent to the pixel to be removed and is not to be removed, the pixel value data is a predetermined value used to update the update pixel, and the pixel value data may be toggled when the update pixel value is determined using the pixel value data and a direction in which the pixel value data is toggled is perpendicular to a direction in which the original image is reduced.

10. The image processing apparatus of claim 9, wherein the pixel value updating unit updates the pixel value of the update pixel with a value corresponding to the pixel value of the update pixel and the pixel value of the pixel to be removed.

11. The image processing apparatus of claim 9, further comprising:

a determining unit for analyzing a processing type set for an interested pixel that is to be processed, wherein the pixel value updating unit reflects the pixel value of the pixel to be removed according to a determination result into a pixel value of the interested pixel that is adjacent to the pixel to be removed and is not to be removed according to the determination result and outputs the reflection result as the pixel value of the interested pixel.

12. The image processing apparatus of claim 11, further comprising:

a pixel maintaining unit for outputting the interested pixel in response to the determination result;

wherein the pixel removing unit removes the interested pixel in response to the determination result; and wherein the reduced image generating unit generates the reduced image using the output result, the removal result, and the reflection result.

13. The image processing apparatus of claim 11, further comprising a processing type setting unit for setting a processing type for each pixel of the original image and providing the setting result to the determining unit.

14. The image processing apparatus of claim 9, wherein the pixel value comprises binary data.

15. A non-transitory computer-readable medium having recorded thereon a set of instructions for an image processing method in which a reduced image is generated, the image instructions comprising:

a first set of instructions for reflecting a pixel value of a pixel to be removed into a pixel value of a pixel adjacent to the pixel to be removed, resulting in an update pixel value;

a second set of instructions for removing the pixel to be removed; and a third set of instructions for generating the reduced image using the reflection result and the removal result;

wherein the reflecting of the pixel value comprises updating the update pixel value to 1 when the value of the pixel to be removed and the value of the update pixel are different from each other and pixel value data is 1, and updating the update pixel value to 0 when the value of the pixel to be removed and the value of the update pixel are different from each other and the pixel value data is 0; and wherein the update pixel indicates a pixel that is adjacent to the pixel to be removed and is not to be removed, the pixel value data is a predetermined value used to update the update pixel, and the pixel value data may be toggled when the updating is performed by referring to the pixel value data and a direction in which the pixel value data is toggled is perpendicular to a direction in which the original image is reduced.

* * * * *